June 4, 1963

A. H. VEDVIK ET AL 3,091,798

SAUSAGE MAKING MACHINE

Filed Jan. 29, 1960

INVENTORS
Andrew H. Vedvik
BY and Alvin Borsuk
Cromwell, Greist & Worden
Att'ys

United States Patent Office 3,091,798
Patented June 4, 1963

3,091,798
SAUSAGE MAKING MACHINE
Andrew H. Vedvik and Alvin Borsuk, Madison, Wis., assignors to Oscar Mayer & Co., Inc., Chicago, Ill., a corporation of Illinois
Filed Jan. 29, 1960, Ser. No. 5,481
15 Claims. (Cl. 17—32)

This invention relates to the preparation of comminuted meat products formed from any suitable source, such as meat trimmings, and is more particularly concerned with improvements in apparatus for shaping uncooked, skinless, sausage type products to provide the same with a standard cylindrical sausage shape.

Uncooked sausages of separate link shape are commercially available in several different forms. In the most common form the sausage product is encased in a natural or synthetic casing material which is relatively tough but fully edible, following cooking of the sausage. While the casing material not only retains the sausage links in link shape, prevents crumbling or breaking thereof during handling, and presents a smooth generally non-tacky surface preventing adherence of the encased sausages to the packaging material or coherence thereof to one another to an extent which would make the links difficult to separate for handling and cooking purposes, the cost of the casing adds materially to the total cost of manufacturing the product and it has always been considered desirable to eliminate the use of casings.

In order to eliminate the use of and avoid the relatively tough mastication properties of natural and synthetic casings, skinless sausages are prepared on a commercial basis by various methods. One such method is set out in detail in copending application Serial No. 846,168, filed October 13, 1959. In the method therein disclosed, the comminuted sausage mix is extruded under pressure and sub-divided to provide individual roughly shaped product portions, the individual product portions are at least surface frozen and thereafter subject to a shaping and compacting operation in a closed mold to provide a product which, in its finished shape, has the appearance of a conventional cylindrical sausage shape.

It is an object of the present invention to provide an apparatus for shaping or molding an uncooked skinless sausage type product which has been previously formed by extruding and sub-dividing into roughly shaped link-like portions and then at least shell freezing the products to an extent that substantial water crystallization occurs at or immediately below the surfaces thereof, so that when the molding is completed permanent compaction of the individual products is obtained with no apparent expansion thereof following the removal of the products from the mold.

It is a more specific object of the invention to provide an apparatus for molding roughly shaped sausage type products which have been at least surface frozen wherein the products are fed into individual mold cavities and compacted therein to provide, when removed from the mold, a product which has a smooth shape, with a pleasing and finished appearance, which is internally cohesive and self-sustaining to a degree sufficient for efficient handling thereof at room temperature, and which has a smooth surface lacking any tendency to stick to other surfaces or adjacent products under temperature conditions such as 40° F.

It is a further object of the invention to provide an apparatus for molding roughly shaped sausages which are at least shell frozen, which apparatus comprises a multiple chamber mold member, a traveling conveyor adapted to carry the sausages in side-by-side relation to a feeding position adjacent the entrance to the mold cavities, and cooperating reciprocal plungers which feed the sausages into the cavities, which compress the same therein to provide the desired shape and compaction thereof and which eject the sausages onto the conveyor for delivery from the machine.

Another object of the invention is to provide in a machine of the character described, a mechanism for use in connection with the further processing of the sausages following the shaping thereof whereby the sausages are dipped in a hot liquid to further modify the surface characteristics thereof before their removal from the machine.

These and other objects and advantages of the invention will be apparent from a consideration of the apparatus which is shown by way of illustration in the accompanying drawings wherein.

Figure 1:
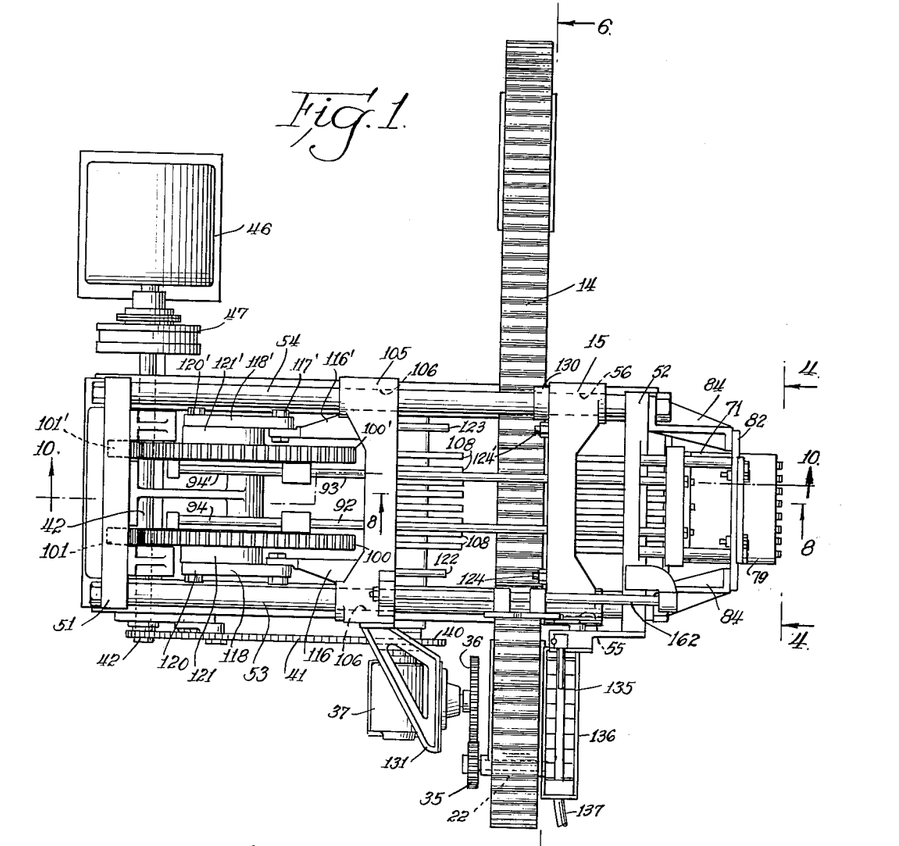
FIGURE 1 is a plan view of a machine for molding sausages which has incorporated therein the principal features of the invention, portions of the machine being omitted or broken away.
Figure 2:
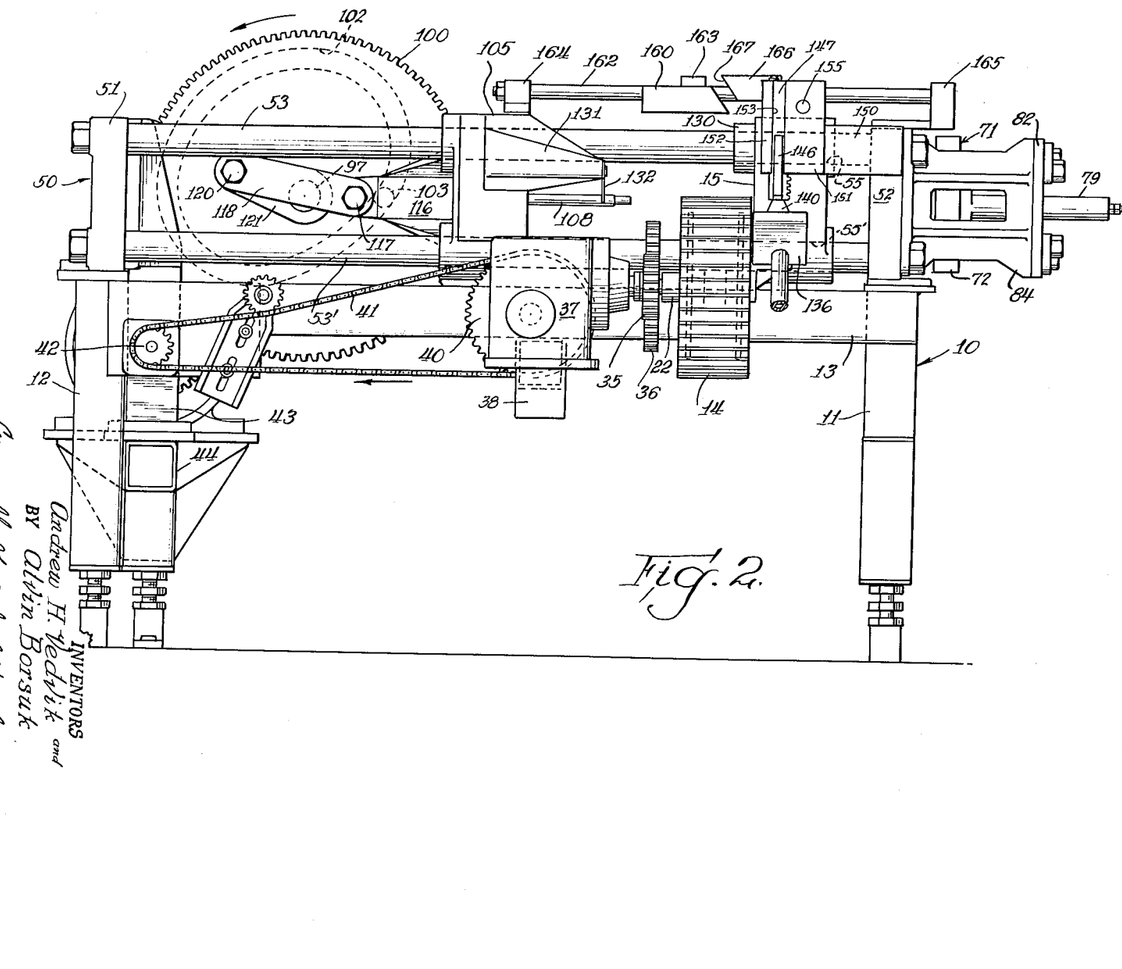
FIGURE 2 is a side elevation of the machine to an enlarged scale, the view being taken at the discharge side of the machine.
Figure 3:
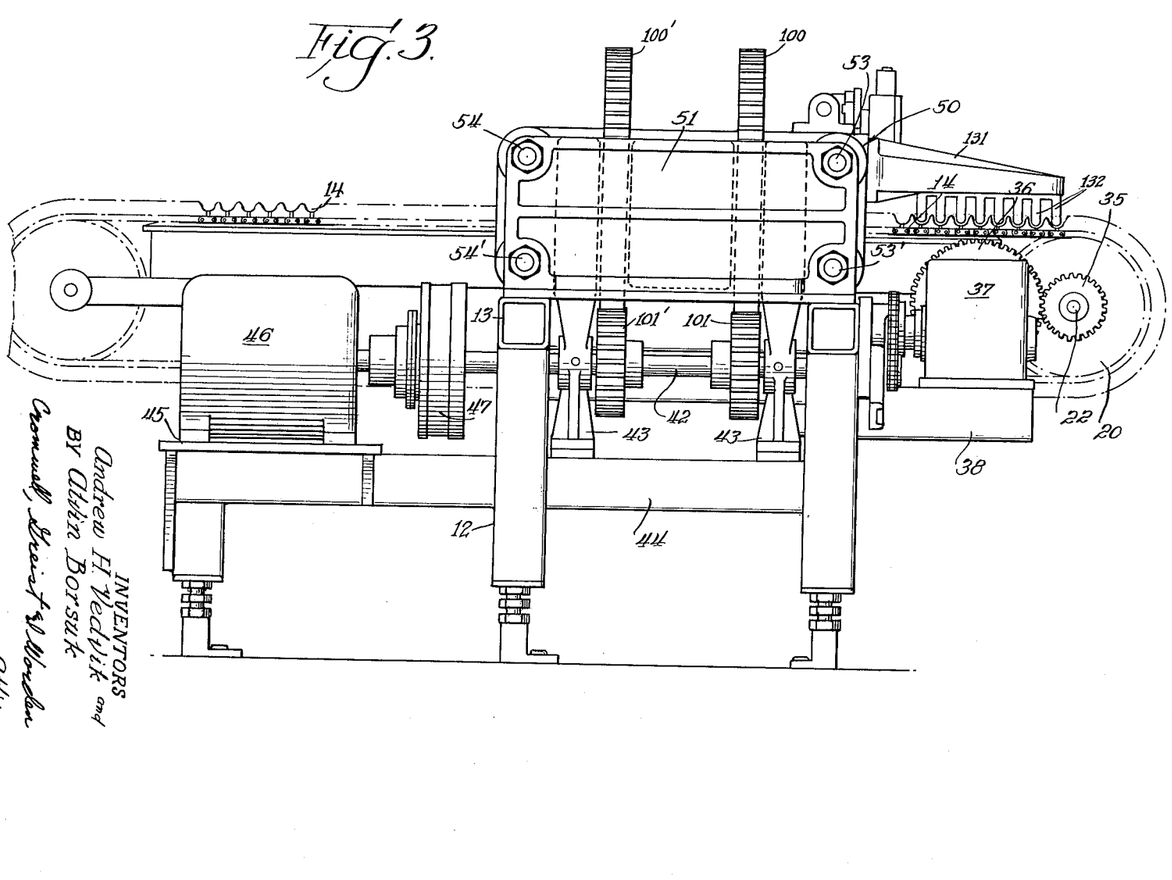
FIGURE 3 is an end elevation of the machine to an enlarged scale.
Figure 4:
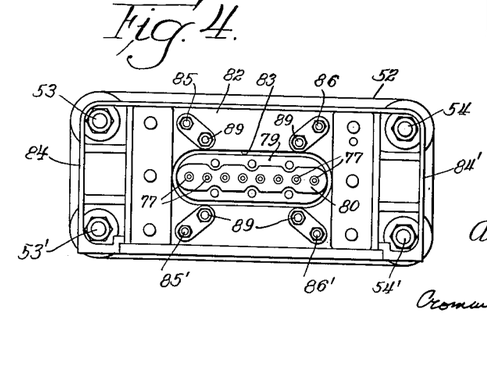
FIGURE 4 is an elevation of the other end of the machine to an enlarged scale, the view being taken generally on line 4—4 of FIGURE 1.

Referring to FIGURES 1 to 3 of the drawings, the machine comprises a generally rectangular base or supporting frame structure 10 characterized by transversely spaced upright corner posts 11 at one end, a vertical transverse rear end frame 12 at the other end, and a horizontal table-like top frame structure 13 on which a link carrying conveyor 14 and a mold assembly 15 with associated operating mechanisms are supported.

Figure 5:
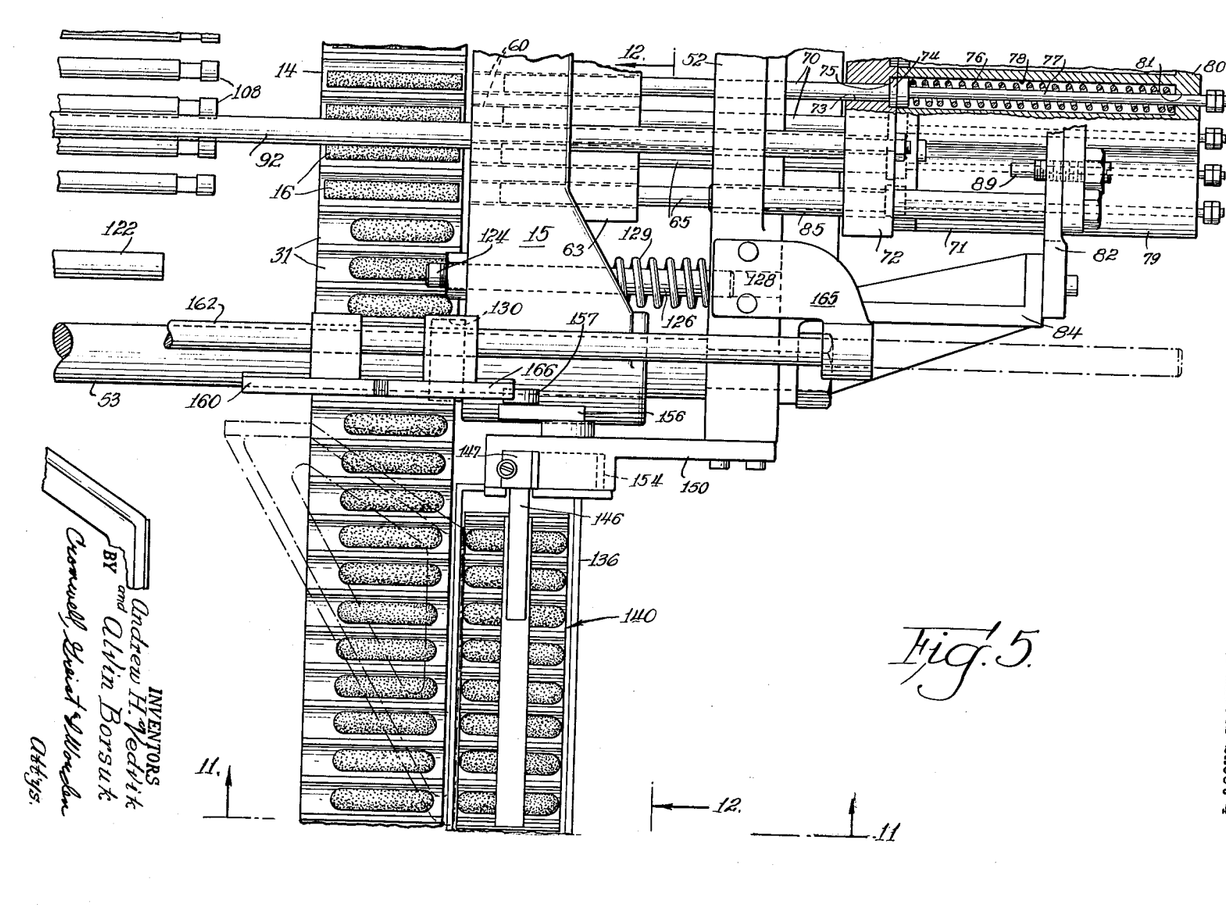
FIGURE 5 is a fragmentary plan view of the machine, to a greatly enlarged scale and with portions broken away.
Figure 7:
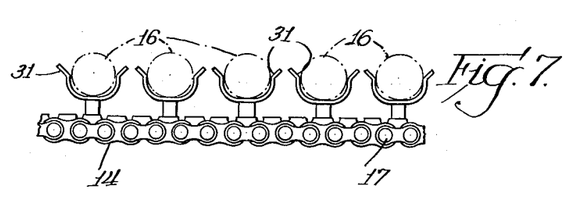
FIGURE 7 is a fragmentary elevation, to an enlarged scale, showing a portion of the conveyor.

The roughly shaped sausages, indicated at 16 in FIG-

URES 5 and 7, are placed initially on one end of the conveyor 14, either manually or mechanically. The conveyor 14 carries the sausages to the molding head 15 where a plurality of the sausages are transferred from the conveyor 14 to the mold 15 and shaped simultaneously in the latter. After the shaping operation the sausages are returned to the conveyor 14 which advances them to a discharge station at the end of the conveyor.

Figure 6:
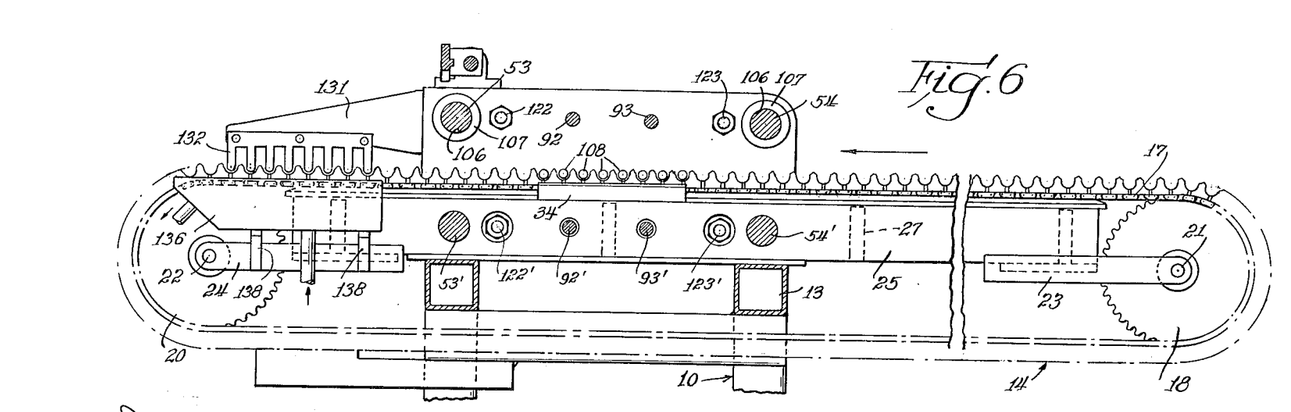
FIGURE 6 is a sectional view taken on the line 6—6 of FIGURE 1 to an enlarged scale and with portions broken away.

The conveyor 14 (FIGURES 6, 7 and 8) comprises a pair of laterally spaced, endless chains 17 which are supported on pairs of laterally spaced end sprockets 18 and 20. The end sprockets 18 and 20 are mounted on cross shafts 21 and 22 which are journaled in bearing bracket frames 23 and 24 carried at opposite ends of a relatively long box or beam-like supporting frame member 25 which is mounted on the top frame structure 13. The chain supporting member 25 comprises a pair of laterally spaced plates 26 which are disposed in vertical planes and tied together by cross braces 27 and which carry on their upper edges guide rails 28 having track formations 30 supporting the upper runs of the conveyor chains 17. The chains 17 carry a series of longitudinally spaced, transversely extending tray or trough-like sausage supporting members 31 which are connected to the chains 17 by bracket forming angles 32 and posts 33. At the center of the machine, where the transfer of the sausages between the conveyor and the molding head occurs, top guard or guide members 34 are provided for holding the chains 17 on the tracks 30 and insuring that there will be no movement in the vertical direction of the pocket forming holders 31 for the sausages 16 while the latter are moved into and out of the mold cavities in the molding head 15.

The sprocket supporting shaft 22 (FIGURES 1, 2 and 3) of the conveyor 14 is extended rearwardly at the discharge end of the conveyor and a gear 35 is secured thereon which meshes with the output gear 36 of an indexing unit 37, the latter being mounted on a supporting bracket 38 extending horizontally from the top frame structure 13 of the machine base 10. The power input shaft of the indexing unit 37 carries a sprocket 40 (FIGURE 2) which is connected by a drive chain 41 with the main power shaft 42 for the machine. The power shaft 42 is journaled in laterally spaced bearing blocks 43 which are supported on a cross beam 44 forming part of the rear end frame 12 of the base 10. The end frame 12 extends to one side of the machine and a platform 45 is provided on the extended end thereof on which a drive motor or other power plant 46 is mounted and connected through a clutch 47 with the drive shaft 42.

The molding head 15 and other elements of the machine are carried on a sub-frame mounted on the table forming top 13 of the base 10. The sub-frame 50 (FIGURES 1 to 3) comprises vertically extending plate-like rectangular castings 51 and 52 extending vertically in parallel relation above the top 13 of the base 10 at opposite ends of the latter. The end plate members 51 and 52 of the sub-frame 50 are connected by four longitudinally extending, cylindrical guide rail forming members or ways 53, 53' and 54, 54' which are arranged at the four corners of the end members 51 and 52 and which form therewith a rectangular frame.

Figure 10:
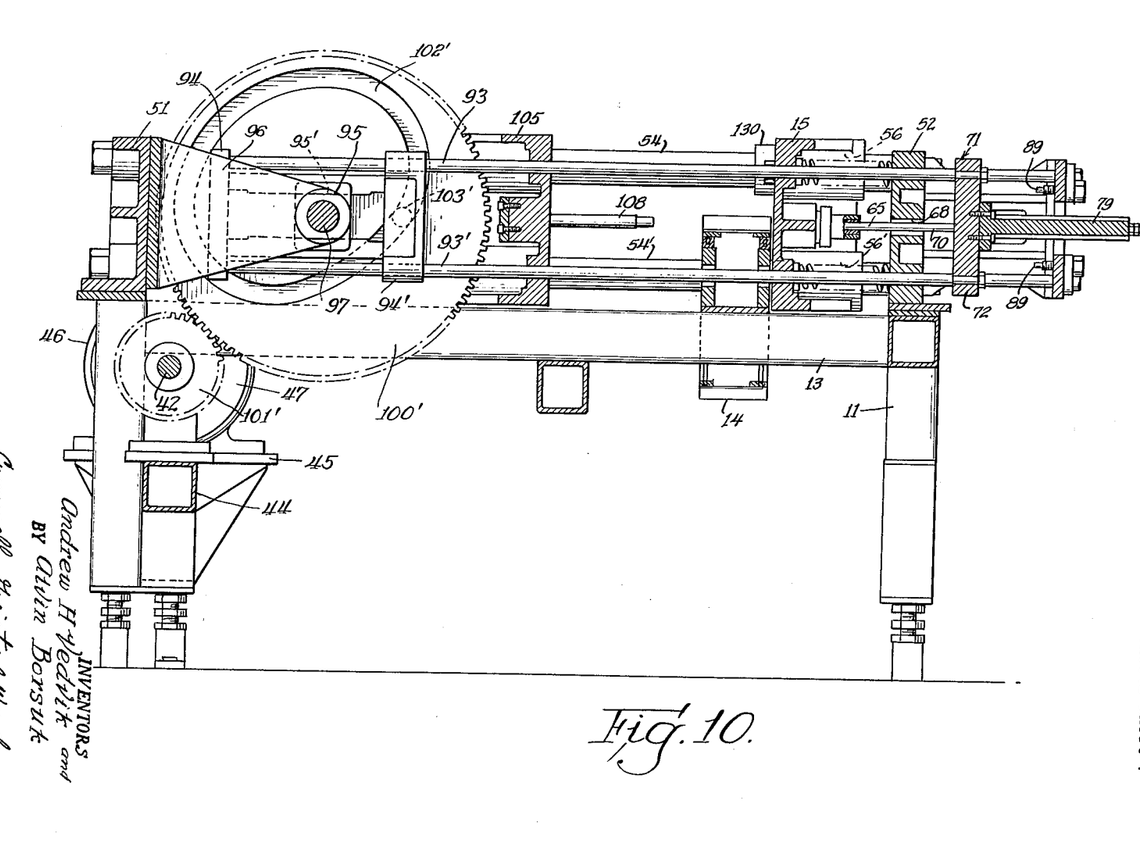
FIGURE 10 is a sectional view, to an enlarged scale, on the line 10—10 of FIGURE 1.
Figure 11:
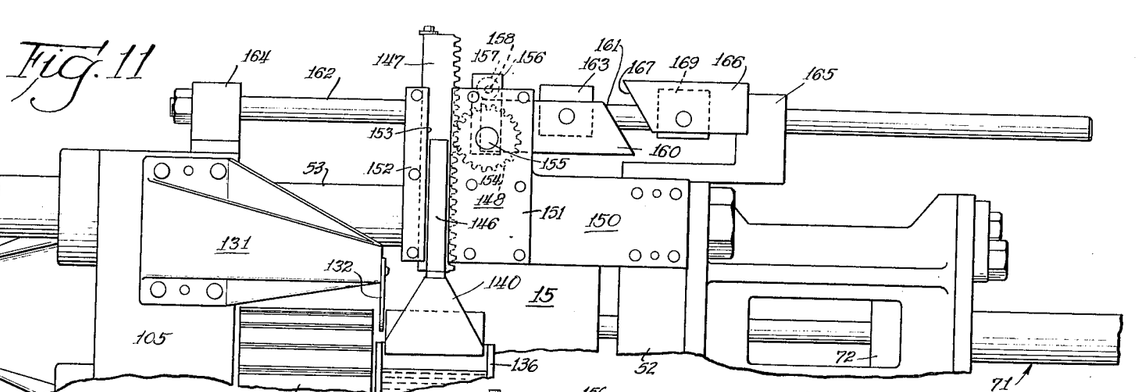
FIGURE 11 is a sectional view taken on the line 11—11 of FIGURE 5.
Figure 12:
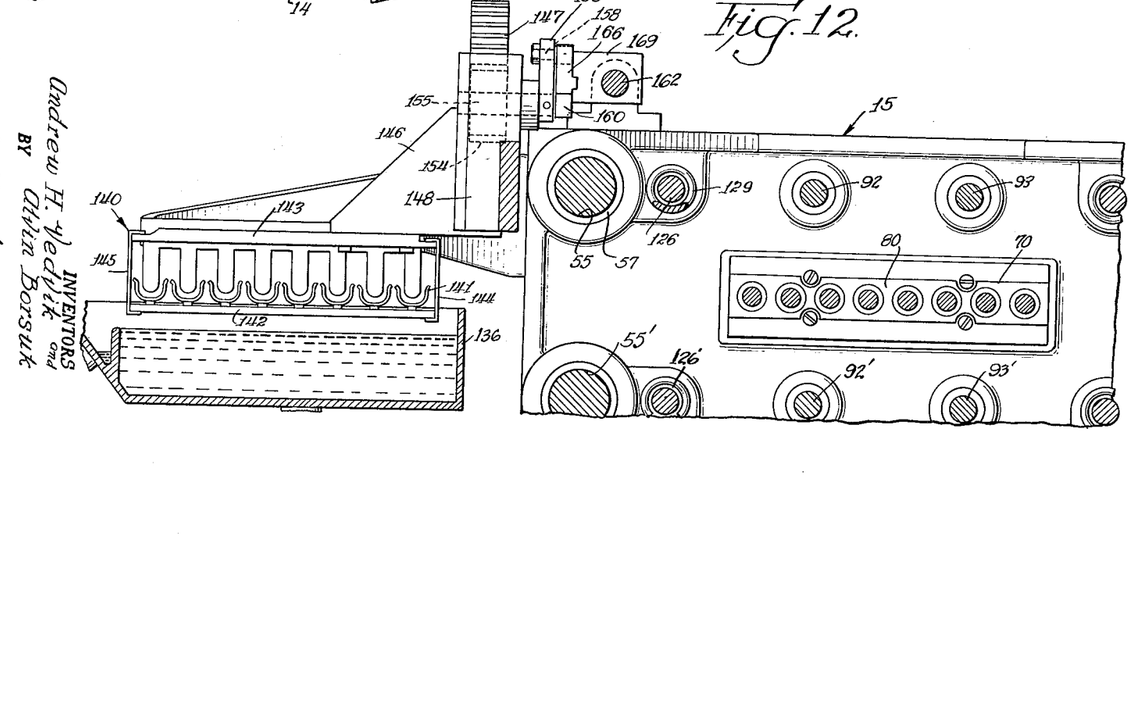
FIGURE 12 is a fragmentary section taken on the line 12—12 of FIGURE 11.

The molding head 15 is in the form of a casting of generally rectangular shape having bearing apertures 55, 55' and 56, 56' (FIGURES 1, 10 and 12) lined with suitable sleeve bearings 57 at the four corners thereof in which the guide rails 53, 53' and 54, 54' are received so that the head 15 is mounted for sliding movement on the rails. The head 15 is provided in its center portion with a series of laterally spaced, horizontally aligned, mold forming members 60 (FIGURES 5, 8 and 9) which are mounted in suitable apertures 61 so as to extend horizontally in the lengthwise direction of the supporting frame 10 with the mold members at a height where they are in alignment with the pocket forming members 31 on the conveyor 14 so as to receive therefrom the sausages 16. The mold forming members 60 (FIGURES 8 and 9) have an internal diameter which corresponds to the desired finished diameter of the sausages 16 and a length in the longitudinal direction of the machine which is approximately equal to the finished length of the sausages. The mold forming members 60 are open at the ends thereof which are adjacent the pocket members 31 on the conveyor 14 while the other ends thereof are aligned with sleeve members 62 in an associated guide member 63 which is secured to the head 15. The sleeve members 62 extend in the longitudinal direction and have their longitudinal axes coinciding with the longitudinal axes of the mold members 60. They are adapted to receive the end portions 64 of molding rods 65 which slide therein. The guide sleeves 62 for the molding rods 65 have an internal diameter which is slightly less than the internal diameter of the mold member 60 so that the ends of the rods 64 may be moved into the mold cavities 60 without contacting the peripheral walls of the cavities. The ends of the molding or end shaping rods 65 are concave as indicated at 66 so as to form rounded ends on the sausages 16. The inner peripheral edges of the sleeves 62 are curved on approximately the same radius as the cavity 66 at the ends of the shaping rod 65, as indicated at 67.

The end molding or shaping rods 65 (FIGURES 5, 8 and 10) extend through apertures 68 provided in the end plate 52 of the sub-frame 50 and are mounted on the ends of support bars 70 which extend from a movable frame or carriage 71 supported in longitudinal sliding relation outboard of the end plate 52. The movable frame or carriage 71 comprises a vertically disposed inner end plate 72 which functions as a sleeve bearing for the rod supports 70, the latter being mounted in slidable relation in laterally spaced bores 73. Each of the rod supports 70 has a shoulder forming enlarged portion 74 which is normally seated in a recess 75 in the outer face of the sleeve plate 72 so as to limit the movement thereof in the one direction relative to the plate 72, and the shoulder is resiliently held in the recess 75 by a compression spring 76 which surrounds a stem 77 of reduced cross section extending in the opposite direction into a pocket 78 in a housing forming member 79 forming the outer part of the carriage 71. The housing 79 extends from the plate 71 outwardly thereof and has an end wall 80 with apertures 81 in which the ends of the reduced stem portions 77 of the rod support members 70 are slidingly secured so that the rod support members 70 normally move with the carriage 71 in a horizontal path and are spring backed for retraction in the housing so as to apply resilient pressure on the ends of the sausage links 16 for the compressing and shaping operation.

The housing 79 is mounted for horizontal sliding movement in a vertically extending bracket plate 82 (FIGURES 1, 2, 4 and 5) which is apertured at 83 to accommodate the housing 79. The bracket plate 82 is secured by angular bracket arms 84 and 84' extending outboard of the end plate 52 of the sub-frame 50. Four guide bars 85, 85' and 86, 86' extend between the bracket plate 82 and the end plate 52 and form guide rods for the end plate 72 of the carriage 71, the end plate 72 having properly aligned apertures 87 (FIGURE 8) with sleeve bearings 88 for receiving the guide rods 85, 85' and 86, 86'. The outward movement of the carriage 71 is limited by adjustable stop pins 89 mounted in the plate 82 adjacent the ends of the guide rods 85, 85' and 86, 86', which pins 89 form back stops for relieving the load on the carriage 71 and its operating cams during the compression of the sausages 16.

The carriage 71 is reciprocated in a horizontal path toward and from the molding head 15 by two laterally spaced pairs of pull rods 92, 92' and 93, 93' (FIGURES 1, 5, 6, 8 and 10), the respective rods in each pair thereof being vertically spaced so that the rods are attached adjacent the four corners of the end plate 72 of the carriage 71. The pairs of pull rods 92, 92' and 93, 93' are attached at their other ends to slide plates or frames 94, 94' which are disposed in vertical planes and in laterally spaced relation for sliding movement on trackways 95 and 95' at opposite ends of the bearing forming inner or hub portions of a bearing support bracket 96 which is secured on the end plate 51 of the sub-frame 50 and extends inwardly thereof for supporting a cross shaft 97 on opposite ends of which two identical combination cam and gear members 100, 100' are mounted. The members 100, 100' are driven by gears 101, 101' which are mounted on the main drive shaft 42. The members 100 and 100' are provided on their opposed faces with cam tracks 102 and 102' for receiving cam rollers 103 carried on the outer faces of the slide plates 94 and 94'. Rotation of the cam forming gear members 100 and 100', of course, reciprocates the slide plates 94 and 94' and moves the carriage 71 in a horizontal reciprocating path.

A pusher mechanism (FIGURES 1, 2, 8, 9 and 10) for transferring the sausages from the conveyor to the molding head 15 is provided which comprises a vertically disposed carriage forming member 105 of generally rectangular shape and provided at its four corners with apertures 106 having suitable bearings 107 therein for slidably receiving the guide bars 53, 53' and 54, 54' on which the other slide mechanisms are mounted. The carriage 105 carries a set of horizontally disposed, laterally spaced pusher rods 108 which are spaced laterally so as to correspond with the spacing of the sausage supports 31 on the conveyor 14. The pusher rods 108 are also arranged in a horizontal plane which is at the proper level to permit the rods 108 to engage with sausages 16 placed in the supports 31 of the conveyor. The rods 108 are provided at their rearward ends with enlarged head portions 110 and their ends are seated in suitable bores 111 in the carriage 105 so that they may be secured in proper position by a cap plate 112. At their free ends the pusher bars 108 are provided with tip forming members 113 which are of a suitable material preferably chrome plated metal. The tip members 113 are detachably secured on the ends of the rods 18 and each one has a convexly shaped recess 114 (FIGURES 8 and 9) in the end face which is adapted to shape the trailing end of the sausage 16 when the latter is transferred into a mold cavity 60 in the molding head 15. The tip members 113 of the rods 108 are of a diameter only slightly less than the diameter of the mold cavities in the mold member 60 so that the tip members 113 slide into the cavities readily, the latter having a beveled entrance end at 115. The carriage 105 is provided with laterally spaced, rearwardly extending bracket arms 116, 116' which are pivotally connected at 117, 117' to link bars 118, 118' with the latter being pivoted at 120, 120' to the free ends of crank arms 121, 121' mounted on the cross shaft 97. Rotation of the shaft 97 reciprocates the head 105 in timed relation to the movement of the carriage 71.

Figures 8, 9:
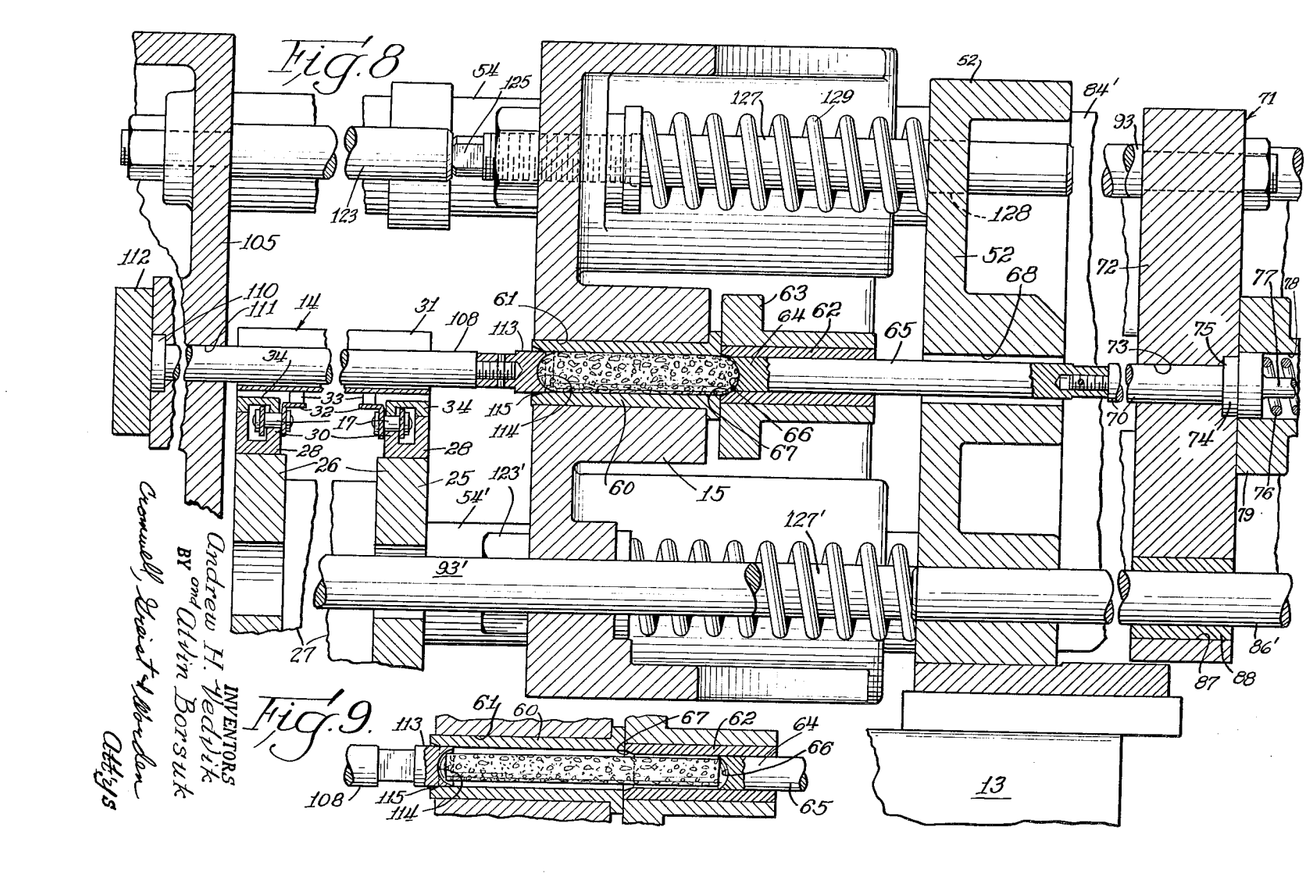
FIGURE 8 is a section taken on the line 8—8 of FIGURE 1, to an enlarged scale and with portions broken away.
FIGURE 9 is a fragmentary sectional view as in FIGURE 8, with the plungers in a different position.

The carriage 105 which carries the sausage transfer members 108 also carries four longitudinally extending pusher pins 122, 122' and 123, 123' (FIGURES 1 and 6) which are arranged in laterally spaced pairs with the respective pins of each pair disposed in vertical spaced relation so as to form a rectangle in a plane extending transversely of the machine. The pins 122, 122' and 123, 123' are aligned to engage with the rearwardly projecting end portions 124, 124' and 125, 125' of horizontally extending pins or rods 126, 126' and 127, 127' which are secured in laterally spaced paired relation in the molding head 15. The rods 126, 126' and 127, 127' each extend forwardly of the forward face of the molding head 15 and have their free ends slidably received in suitable apertures 128 (FIGURE 5) in the sub-frame end plate 52. Each of the pins 126, 126' and 127, 127' carries a compression spring 129 which normally urges the head 15 in the direction of the conveyor 14 with its movement being limited by stop collars 130 provided on the guide rails 53, 53' and 54, 54'. The pusher pins 122, 122' and 123, 123' and spring supporting rods 126, 126' and 127, 127' are arranged so that when the carriage 105 moves up to the conveyor 14 and the pusher rods 108 transfer a group of sausages 16 into the molding cavities in the head 15 and the end portions or tip members 113 on the pusher rods 108 enter the ends of the cavities 60, as shown in FIGURE 9. The pusher pins 122 engage the ends 125, 125' of the rods 126, 126' and 127, 127' and push the head 15 in the direction of the frame end plate 52, the limit of this movement being shown in FIGURE 8. At the same time, the end shaping rods 65 are moved toward the other ends of the mold cavities by movement of the carriage 71 to the position shown in FIGURE 8. The sausages are compressed between the ends of the pusher rods 108 and the end shaping rods 65 as the molding head 15 and the pusher rods 108 move forward together, the rods 65 being fully retracted as the molding head 15 advances away from the conveyor 14 and moves toward the end plate 52. The pressure on the rods 65 during the compression of the sausages is transmitted to the back stop pins 89 so as to relieve the operating cams for the carriage 71. Immediately after the sausages are compressed and their ends shaped, the carriage 105 starts its retractive or withdrawal movement and carries the rods 108 towards the rear of the machine to remove the ends 113 thereof from the mold cavities 60 and simultaneously to allow the head 15 to move to its initial position adjacent the edge of the conveyor 14. The carriage 71 also begins to move in the direction towards the head 15 so as to advance the rods 65 through the mold cavities and eject the shaped sausages 16 onto the conveyor 14 for delivery from the machine. The molding head 15 retracts at a faster rate than the rate of advance of the carriage 71 in the direction of the head 15 so that the molding pressure is relieved immediately the return stroke of the head 15 begins. The advancing movement of the conveyor 14 is timed so that it strips the ejected sausages from the ends of the rods 65 and the carriage 71 retracts immediately the sausages are released from the rods 65 and moves to the right in FIGURE 1 so as to retract the end shaping rods 65 to the position shown in FIGURE 9. This completes the shaping and compressing cycle of operations.

The carriage 105 carries, in addition to the pusher and shaper fingers 108, an ejector or discharge mechanism for removing the finished sausages from the conveyor 14 at the discharge end thereof. The discharge mechanism (FIGURES 1, 2, 5 and 6) comprises a horizontally disposed bracket 131 extending laterally at the discharge side of the machine and attached to the end of the carriage 105. The bracket 131 carries on its forward face a series of depending sausage engaging discharge fingers 132 which are in a vertical plane parallel with the direction of movement of the conveyor 14 and which depend from the bracket 131 to bring their rounded lower ends into alignment with the pocket forming members 31 on the conveyor 14. The bracket 131 and the discharge fingers 132 are arranged so that movement of the head 105 engages the fingers 132 with a group of the finished sausages 16 at the discharge end of the conveyor 14 and pushes the same laterally of the conveyor 14 out of the pockets 31. A suitable discharge chute, collecting container, or conveyor (not shown) may be arranged at the discharge end of the conveyor 14 for collecting the finished sausages 16. However, it may be desirable to further process the sausages 16 by dipping the same in a processing liquid before they are removed from the machine. A mechanism for accomplishing this operation is illustrated in connection with the shaping machine as herein disclosed.

The dipping mechanism 135 (FIGURES 1, 2, 5, 6, 10, 11 and 12) comprises a tank 136 with a suitable discharge spout 137 which is mounted by means of brackets 138 on the end of a support member 25 for the conveyor 14. A dip frame or rack 140 is supported for vertically reciprocating movement above the dip tank 136. The dip rack 140 comprises a series of spaced, parallel pocket forming members 141 of the same character as the sausage supporting pocket members 31 on the conveyor 14. The pocket members 141 are mounted on an elongate base plate 142 which is connected in spaced relation beneath a top support bar 143 by end brackets 144 and 145. The top support bar 143 is connected at one end to a vertically extending, triangular shaped bracket member 146. The bracket plate 146 has its vertical edge secured to a vertically disposed rack bar 147 which is mounted for vertical movement in a housing 148 on the end of a longitudinally extending L-shaped support bracket 150 which is secured at the end of the one leg thereof to the end plate member 52 of the top sub-frame 50. The bracket member 150 extends in a vertical, longitudinal plane parallel to and outside of the upper longitudinal guide bar 53. The housing forming portion 148 of the bracket 150 extends vertically outside the path of movement of the end of the molding head 15. The housing 148 is provided with cover plates 151 and 152 which have vertical edges spaced apart to provide a guide slot 153 for receiving the vertically disposed bracket plate 146 which has a thickness somewhat less than the width of the rack bar 147 and slides in the recess 153 as a guideway. A pinion 154 which is mounted on a cross shaft 155 journaled in the housing 148 engages with the rack 147. The pinion shaft 155 carries a lever or cam arm 156 at the inner end thereof on the free end of which a cam roller 157 is rotatably mounted by means of the support pin 158. The cam arm 156 is adapted to be swung to rotate the pinion 154 and lower the dip rack 140 by engagement with a cam plate 160 which cam plate has an upwardly slanted forward end edge 161 and which is secured on the movable bar or rod 162 by means of the mounting bracket 163. The rod 162 is secured at one end by the bracket 164 to the movable carriage 105 for the sausage transfer and discharge mechanism. At its other end the rod 162 is slidably supported by the apertured bearing bracket 165 which is mounted on the end plate member 52 of the sub-frame 50. A second cam plate 166 is provided which has a downwardly tapered rearward end edge 167 in opposed relation to the end edge 161 of the cam plate 160. The cam plate 166 is mounted on the support rod 162 by means of bracket member 169 and extends above the cam plate 160 so as to insure that the cam roller 157 will engage the cam edge 167 when the rod 162 moves rearwardly so as to operate the pinion 154 to raise the dip rack 140 out of the dip tank 136 with the cam plates 160 and 166 being positioned on the rod 162 so that the raising and lowering movement of the dip rack 140 is properly timed relative to the movement of the ejector fingers 132 to permit the fingers 132 to move a group of sausages 16 onto the dip rack 140 in proper timed relation and on the next cycle to move the next batch of sausages onto the dip rack 140 and eject the sausages which have been subjected to the dipping operation. A suitable receptacle, discharge chute or discharge conveyor (not shown) may be arranged adjacent the discharge side of the dip rack 140 to receive the sausages as they are ejected from the same by movement of the fingers 132.

In operating the machine, the sausages 16 are initially placed in the pockets formed by the members 31 on the conveyor 14 and the conveyor is operated to bring a series or group of the sausage supporting pocket members 31 into alignment with the mold cavities 60 in the molding head 15. The conveyor is then stopped a sufficient length of time to permit the sausages to be transferred to the molding head 15 by operation of the carriage 105 and the pusher members 108 and to be returned to the conveyor by the rods 65 after the completion of the molding operation. The movement of the carriage 105 is timed to operate in synchronism with the conveyor 14 and to carry the transfer rods 108 through the pockets in the conveyor 14 so as to move a group of the roughly formed sausages 16 into the molding cavities 60 in the head 15 with the end members 113 of the pusher rods 108 moving a short distance into the ends of the cavities 60 as shown in FIGURE 9. The sausages 16 are compressed by simultaneous movement of the rods 108 and the molding head 15 to the position shown in FIGURE 8. The end shaping rods 65 which are carried on the movable carriage 71, are fully retracted when the movement of the molding head 15 begins, having been moved by operation of the pull rods 92, 92' and 93, 93' to the position shown in FIGURE 8 and being held in that position while compression occurs. The carriage 105 begins to retract as soon as the compression is completed so as to immediately relieve the pressure. The carriage 71 begins its movement in the direction of the molding head 15 and continues at a slower rate than the retraction of the molding head 15. The retraction of the carriage 105 allows the molding head 15 to return to its initial position adjacent the edge of the conveyor 14 while the rods 108 withdraw to a position on the rear side of the conveyor pockets 31. The rods 65 advance through the mold cavities in the molding head 15 to eject the shaped sausages and return the sausages to the pockets 31 of the conveyor. The conveyor immediately advances and strips the sausages from the ends of the rods 65 before the latter begin their retractive movement. The discharge fingers 132 at the discharge end of the conveyor are moved with the head 105 and sweep out of the pockets 31 at the discharge end of the conveyor a group of formed sausages simultaneously with the transfer of a group of the unprocessed sausages into the mold cavities in the molding head 15.

When the sausages are subjected to a dipping operation the fingers 132 move the group onto the dipping rack 140 which is reciprocated vertically in timed relation to the movement of the carriage 105 so that a group of sausages is dipped in the tank 136 while another group is being compressed and shaped. The dipped sausages are thereafter returned to a position in alignment with the pockets in the conveyor 31 so that upon the next cycle of operation the discharge fingers 132 may push a further group of the formed sausages into the dipping rack 140 and eject the group which has previously been subjected to the dipping operation. The various movable elements of the machine are timed to cooperate with each other and the cycle of operation is repeated as soon as completed.

While particular materials and specific details of construction have been referred to in describing the form of the machine illustrated, it will be understood that other materials and different details of construction may be resorted to within the spirit of the invention.

We claim:

1. In a machine for shaping sausage type meat products, an endless conveyor having a horizontal run with pockets thereon for supporting a plurality of roughly shaped links with their long axis in parallel spaced relation and for advancing the links in a direction laterally of their long axis, a molding head having a plurality of horizontal open ended molding cavities arranged with their long axes in spaced, parallel relation, means for mounting said molding head at one side of said conveyor run so that links positioned in the conveyor pockets are axially aligned by movement of the conveyor with the cavities in the molding head, pusher members mounted on the other side of said conveyor run in alignment with the cavities in the molding head and movable across the conveyor to push the links into the molding cavities, end shaping and ejector members mounted on the opposite side of the molding head and having the end shaping portions movable axially in the cavities, means to move the pusher members into the cavities to compress the links between the pusher members and the end shaping and ejector members, and means to move the end shaping and ejector members through the cavities to return the shaped links to the conveyor pockets.

2. In a machine for shaping sausage type meat products, an endless traveling conveyor, means to support said conveyor for travel in a horizontal plane, said conveyor having pockets thereon for supporting on the upper run thereof a plurality of roughly shaped sausage links with their long axis in parallel, spaced relation and for advancing the links in a horizontal plane and in a direction laterally of their long axis, a molding head having a plurality of open ended cylindrical molding cavities arranged with their long axes in spaced, parallel relation, means mounting said molding head for movement in a horizontal plane and at one side of said conveyor so that links positioned in the conveyor pockets may be aligned by movement of the conveyor with the open ends of the molding cavities in the molding head, a pusher head mounted adjacent the other side of the conveyor and having pusher rods thereon which are spaced to align with the cavities in the molding head, means to operate the pusher head so as to move the pusher rods across the conveyor and push the links into the molding cavities, end shaping and ejector rod members mounted on the side of the molding head which is opposite the conveyor and in axial alignment with the molding cavities, said end shaping and ejector rod members having portions movable within the molding cavities which are of smaller cross sectional diameter than the corresponding dimension of the molding cavities, and means to move the pusher rods, the molding head and the end shaping and ejector rod members in timed relation to compress the links within the molding cavities and between the ends of the pusher rods and the end shaping and ejector rod members and thereafter to eject the shaped links from the molding cavities.

3. A sausage shaping machine comprising an upright supporting frame, a molding head mounted on the supporting frame and having a series of spaced, open ended molding cavities arranged therein, a conveyor mounted on said supporting frame with an upper run having means for supporting a series of sausages arranged in parallel relation thereon, means to operate said conveyor to position a predetermined number of the sausages in axial alignment with the cavities in the molding head adjacent one end thereof, cooperating sausage compressing and end shaping members initially positioned on opposite sides of the molding head in axial alignment with the molding cavities, carriages for said compressing and end shaping members mounted on said supporting frame for movement toward the molding head so as to move said compressing and end shaping members into the ends of the molding cavities, said conveyor having its upper run positioned between one side of the molding head and the adjacent compressing and end shaping members, means to move the compressing and end shaping members relative to the molding head so as to push the sausages from the conveyor into the molding cavities and compress the same therein, and thereafter to return the shaped sausages to the conveyor and the compressing and end shaping members to their initial positions.

4. A sausage shaping machine as recited in claim 3 and the sausage compressing and end shaping members on one side of the molding head being slidably mounted on the carriage therefor with a yieldable backing to normally hold them against retractive movement.

5. A sausage shaping machine comprising an upright supporting frame, a molding head movably mounted on the supporting frame and having a series of spaced, open ended molding cavities arranged therein, a conveyor having an upper run and means for supporting a series of sausages arranged in parallel relation thereon, said conveyor being mounted on the supporting frame and being operated to position a predetermined number of the sausages in axial alignment with the cavities in the molding head adjacent one end thereof, cooperating sausage compressing and end shaping members movably mounted on opposite sides of the molding head in axial alignment with the molding cavities, means for supporting said compressing and end shaping members for movement toward and from the molding head, said conveyor having its upper run positioned to travel between the molding head and the compressing and end shaping members at one side thereof, and means to move the compressing and end shaping members toward the molding head so as to push the sausages from the conveyor into the molding cavities and compress the same therein, means to move the molding head away from the conveyor during the compressing of the sausages in the molding cavities and thereafter to return the molding head to its initial position adjacent said conveyor, means to retract the compressing and end shaping members and means to return the sausages to the conveyor.

6. A sausage link shaping machine comprising an upright supporting frame having parallel, longitudinally extending ways thereon, a molding head mounted for movement on the ways, a conveyor having a run thereof extending across the machine with a series of parallel spaced pocket forming members for receiving roughly shaped links in spaced side-by-side relation, said conveyor run moving in a path at one side of the molding head, said molding head having a series of parallel, longitudinally extending mold cavities arranged in the same plane and with the same spacing as the pocket forming members on the conveyor, a pusher head mounted on said ways and having pusher rods mounted thereon for movement across the conveyor, said pusher rods having sausage engaging portions at the free ends thereof for moving a plurality of the links from the pocket forming members into the mold cavities, a reciprocable carriage mounted on said supporting frame at the side of the molding head which is opposite said conveyor, a plurality of end shaping and link ejecting rods mounted on said carriage in alignment with the said molding cavities and movable within said cavities whereby to compress and shape the ends of links when said links are moved therein by said pusher rods and thereafter to return the shaped links to the conveyor pocket forming members, spring means for normally urging said molding head toward said conveyor and means on said pusher head for moving said molding head away from said conveyor upon predetermined movement of said pusher head.

7. A sausage link shaping machine comprising an upright supporting frame having parallel, longitudinally extending ways thereon, a molding head mounted for movement on the ways, a conveyor having a run thereof extending across the machine with a series of parallel spaced link supporting trays thereon for receiving roughly shaped links in spaced side-by-side relation, said conveyor run moving in a path at one side of the molding head, said molding head having a series of parallel, longitudinally extending mold cavities arranged in the same plane and with the same spacing as the trays on the conveyor, a pusher head mounted on said ways and having pusher members mounted thereon for movement across the conveyor, said pusher members having sausage end engaging portions for moving a plurality of the links from the supporting trays into the mold cavities, a reciprocable carriage mounted on said supporting frame at the side of the molding head which is opposite said conveyor, a plurality of link engaging spring backed rods mounted on said carriage in alignment with the said molding cavities and end portions movable into said cavities to engage and shape the ends of the links moved therein by said pusher members, means for moving said carriage after the links are shaped to eject the links from the mold cavities and return the same to the conveyor trays, resilient means for normally urging said molding head toward said conveyor and means on said pusher head for moving said molding head away from said conveyor upon movement of said pusher head for insertion of the links into the mold cavities.

8. A sausage link shaping machine comprising an upright supporting frame having parallel, longitudinally extending ways thereon, a molding head mounted for sliding movement on the ways, a conveyor having a run thereof extending across the machine with parallel spaced pocket forming trays thereon for receiving roughly shaped links in spaced side-by-side relation, said conveyor run moving in a path along one side of the molding head, said molding head having a series of parallel, longitudinally extending cylindrical mold cavities arranged in the same plane and with the same spacing as the trays on the conveyor, a reciprocable carriage mounted on said ways and having pusher rods mounted thereon for movement across the conveyor, said pusher rods having cup shaped sausage engaging end portions for moving a plurality of the links from the trays into the mold cavities, a second reciprocable carriage mounted on said supporting frame at the side of the molding head which is opposite said conveyor, a plurality of link shaping and ejecting rods mounted on said carriage in alignment with the said mold cavities, said shaping and ejecting rods having cup shaped end portions which are movable within said cavities to engage and shape the ends of links moved therein by said pusher rods, said shaping and ejecting rods having a cross section substantially smaller than the cross section of said mold cavities so as to move through the mold cavities without engaging the walls thereof, and means for moving said carriages and said molding head in sequence to position the links in the cavities, compress the links between the cupped ends of said rods and finally move the shaped links out of the mold cavities and into the conveyor trays.

9. A sausage link shaping machine comprising an upright supporting frame having parallel, longitudinally extending ways thereon, a molding head mounted for sliding movement on the ways, a conveyor having a run thereof extending across the machine with a series of parallel spaced pocket forming trays thereon for receiving roughly shaped links in spaced side-by-side relation, said conveyor run moving in a path along one side of the molding head, said molding head having a series of parallel, longitudinally extending mold cavities arranged in the same plane and with the same spacing as the trays on the conveyor, a pusher head mounted on said ways and having pusher rods mounted thereon for movement across the conveyor, said pusher rods having sausage end engaging and shaping portions for transferring a plurality of the links from the conveyor trays to the mold cavities, a reciprocable carriage mounted on said supporting frame at the side of the molding head which is opposite said conveyor, a plurality of end shaping and ejecting rods mounted on said carriage in alignment with the said mold cavities and having end portions movable into said cavities to shape the ends of links held therein by said pusher rods and to cooperate with said pusher rods in compressing the links, said shaping and ejecting bars being advanced into the cavities to return the shaped links to the conveyor trays after the compressing and upon retraction of said pusher rods, resilient means for normally urging said molding head toward said conveyor, means on said pusher head for moving said molding head away from said conveyor upon forward movement of said pusher head to transfer the links to the mold cavities, and link discharge fingers mounted on said pusher head in spaced relation to said pusher rods and aligned with the conveyor trays to discharge shaped links from the trays upon forward movement of said pusher head.

10. In a machine for shaping sausage type meat products, a conveyor having pockets extending transversely thereon for receiving roughly shaped links with their long axis in parallel, spaced relation, means for advancing the conveyor to position the links at a molding station, a molding head at the molding station and having a plurality of open ended mold cavities arranged with their long axes in spaced, parallel relation, said molding head being mounted so that links positioned in the conveyor pockets are aligned by movement of the conveyor with the mold cavities in the molding head, pusher members movably mounted at the molding station in alignment with said mold cavities and means to move the pusher members so as to push a series of links from the conveyor pockets into the mold cavities, end shaping and ejector members movably mounted at the molding station on the side of the molding head which is opposite the pusher members and in axial alignment with the mold cavities and means to move said end shaping and ejector members so as to cooperate with said pusher members to compress the links between the same and thereafter to move through the mold cavities and return the links to the conveyor pockets.

11. In a machine as recited in claim 10 and a dip tank adjacent said conveyor at a point spaced beyond the molding station, means adjacent the dip tank for transferring shaped links from the conveyor pockets to the dip tank, and means adjacent the dip tank for removing the links from the dip tank after the dipping operation.

12. In a machine as recited in claim 10 and a fluid containing tank positioned at a dipping station adjacent said conveyor and spaced beyond the molding station, a link carrying rack mounted adjacent said tank for movement into and out of said tank, and means for transferring shaped links from the conveyor pockets to said rack.

13. In a machine for shaping sausage type meat products, an endless traveling conveyor having a horizontal run with transversely extending parallel pockets thereon for supporting a plurality of roughly shaped links with their long axis in parallel spaced relation and for advancing the links in a horizontal path and in a direction laterally of their long axis, a molding head having a plurality of open ended molding cavities arranged horizontally with their long axes in spaced, parallel relation and extending in a direction transversely of said conveyor run, means mounting said molding head on one side of the horizontal run of said conveyor so that links positioned in the conveyor pockets are aligned with the cavities in the molding head, pusher members, means mounting the pusher members on the opposite side of the conveyor in alignment with the cavities in the molding head for movement across the conveyor to push the links from the conveyor pockets into the molding cavities, end shaping and ejector rods, means mounting said end shaping and ejector rods on the side of the molding head which is opposite the conveyor for movement in axial alignment into the cavities, each of said end shaping and ejector rods having an end portion with a cross section somewhat smaller than the cross section of the molding cavities which end section is movable axially in a molding cavity and means to move the pusher members and the end shaping and ejector rods into and out of the molding head in timed relation whereby to compress the links between said pusher members and said end shaping and ejector rods, and means to move the end shaping and ejector rods through the cavities to return the shaped links to the conveyor pockets.

14. In a machine as recited in claim 13, and said pusher members and said end shaping and ejector rods having concave end faces which engage the ends of the links to shape the same.

15. In a machine for shaping sausage type meat products, a conveyor having a horizontal run with pockets thereon for supporting a plurality of roughly shaped sausage links which are arranged with their long axis disposed transversely of the path of the conveyor and in parallel, spaced relation, means to operate the conveyor so as to advance the links, a molding head having a plurality of open ended molding cavities arranged with their long axes in spaced, parallel relation, means to mount said molding head at one side of said conveyor run so that the conveyor pockets are aligned by advancing movement of the conveyor with the cavities in the molding head, a pusher head, means to movably mount said pusher head on the side of the conveyor opposite the molding head, pusher rods on said pusher head extending horizontally in alignment with the cavities in the molding head and movable by operation of the pusher head across the conveyor to push the links from the pockets of the conveyor into the molding cavities, a carriage mounted for reciprocating movement on the side of the molding head which is opposite the conveyor, end shaping and ejector members mounted on said carriage in axial alignment with the molding cavities, means to move said pusher head and said carriage toward the molding head so as to carry the sausages into the molding cavities and to compress the links between said pusher rods and said end shaping and ejector members and means to retract said pusher head and to advance said carriage so as to move said end shaping and ejector members through said molding cavities and return the links to the conveyor pockets.

References Cited in the file of this patent

UNITED STATES PATENTS

| | | |
|---|---|---|
| 994,714 | Boyle | June 13, 1911 |
| 2,384,163 | Flowers | Sept. 4, 1945 |
| 2,865,311 | Thurlings | Dec. 23, 1958 |